(12) United States Patent
Letas

(10) Patent No.: US 11,018,609 B2
(45) Date of Patent: May 25, 2021

(54) CONTROL OF A WIND TURBINE BY CHANGING ROTATION RATE PARAMETERS

(71) Applicant: Senvion GmbH, Hamburg (DE)

(72) Inventor: Heinz-Hermann Letas, Bovenau (DE)

(73) Assignee: Senvion GmbH, Hamburg (DE)

(*) Notice: Subject to any disclaimer, the term of this patent is extended or adjusted under 35 U.S.C. 154(b) by 0 days.

(21) Appl. No.: 16/245,320

(22) Filed: Jan. 11, 2019

(65) Prior Publication Data
US 2019/0214927 A1 Jul. 11, 2019

(30) Foreign Application Priority Data
Jan. 11, 2018 (DE) .................. 10 2018 000 157.2

(51) Int. Cl.
| | |
|---|---|
| H02P 9/00 | (2006.01) |
| F03D 9/25 | (2016.01) |
| H02J 3/38 | (2006.01) |
| H02P 9/10 | (2006.01) |
| H02P 101/15 | (2016.01) |

(52) U.S. Cl.
CPC .............. *H02P 9/008* (2013.01); *F03D 9/255* (2017.02); *H02J 3/386* (2013.01); *H02P 9/006* (2013.01); *H02P 9/007* (2013.01); *H02P 9/107* (2013.01); *H02P 2101/15* (2015.01)

(58) Field of Classification Search
CPC .......... H02P 9/008; H02P 9/006; H02P 9/007; H02P 9/107; H02P 2101/15; F03D 9/255; H02J 3/386
See application file for complete search history.

(56) References Cited

U.S. PATENT DOCUMENTS

| | | | | |
|---|---|---|---|---|
| 4,994,684 A | * | 2/1991 | Lauw ........................ | H02P 9/42 290/40 C |
| 6,137,187 A | * | 10/2000 | Mikhail ................ | F03D 7/0224 290/44 |
| 6,420,795 B1 | * | 7/2002 | Mikhail .................. | H02P 9/007 290/44 |
| 2002/0105189 A1 | * | 8/2002 | Mikhail ................ | F03D 7/0224 290/44 |
| 2009/0322079 A1 | * | 12/2009 | Letas ....................... | H04B 3/54 290/7 |
| 2010/0133826 A1 | * | 6/2010 | Santiago .................. | H02K 3/28 290/44 |

(Continued)

*Primary Examiner* — Tulsidas C Patel
*Assistant Examiner* — Joseph Ortega
(74) *Attorney, Agent, or Firm* — Bay State IP, LLC

(57) ABSTRACT

A method for controlling a wind turbine with a wind rotor (2), a doubly-fed induction generator (1) driven therewith, and a converter (4), which is electrically connected to feed electrical energy into an electrical grid (8) with at least one grid parameter, and having a controller with a memory in which rotation rate parameters are stored, characterized in that at least one variable characteristic curve is determined between at least one of the rotation rate parameters and the at least one grid parameter, the at least one characteristic is stored in the memory, the at least one grid parameter is measured, the grid parameter measurements are fed to the controller, the values of the at least one rotation rate parameter associated with the grid parameter measurements via the at least one characteristic curve are activated.

15 Claims, 7 Drawing Sheets

(56) References Cited

U.S. PATENT DOCUMENTS

| | | | | |
|---|---|---|---|---|
| 2010/0320762 | A1* | 12/2010 | Letas | H02P 9/007 |
| | | | | 290/44 |
| 2012/0056602 | A1* | 3/2012 | Li | H02P 9/48 |
| | | | | 322/89 |
| 2012/0104756 | A1* | 5/2012 | Beekmann | F03D 7/048 |
| | | | | 290/44 |
| 2012/0161444 | A1* | 6/2012 | Tarnowski | F03D 7/0284 |
| | | | | 290/44 |
| 2013/0170254 | A1* | 7/2013 | Letas | H02P 9/007 |
| | | | | 363/34 |
| 2015/0333677 | A1* | 11/2015 | Letas | F03D 9/255 |
| | | | | 290/44 |
| 2015/0365031 | A1* | 12/2015 | Wessels | H02J 3/1885 |
| | | | | 290/44 |
| 2016/0177923 | A1* | 6/2016 | Edenfeld | F03D 9/25 |
| | | | | 290/44 |
| 2016/0308368 | A1* | 10/2016 | Letas | H02J 3/386 |
| 2018/0366977 | A1* | 12/2018 | Ganireddy | H02J 11/00 |
| 2020/0166017 | A1* | 5/2020 | Hansen | F03D 7/0224 |

* cited by examiner

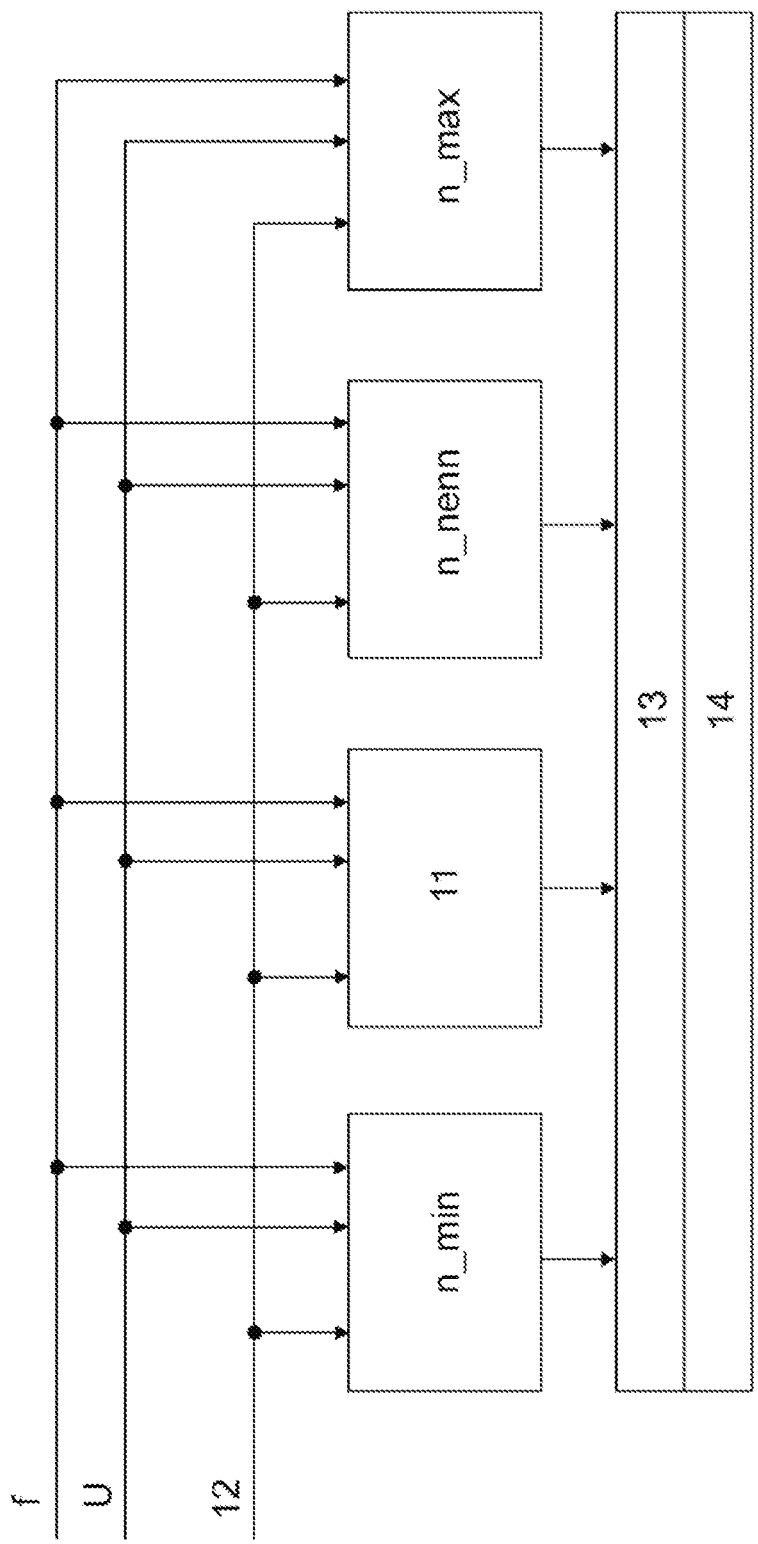

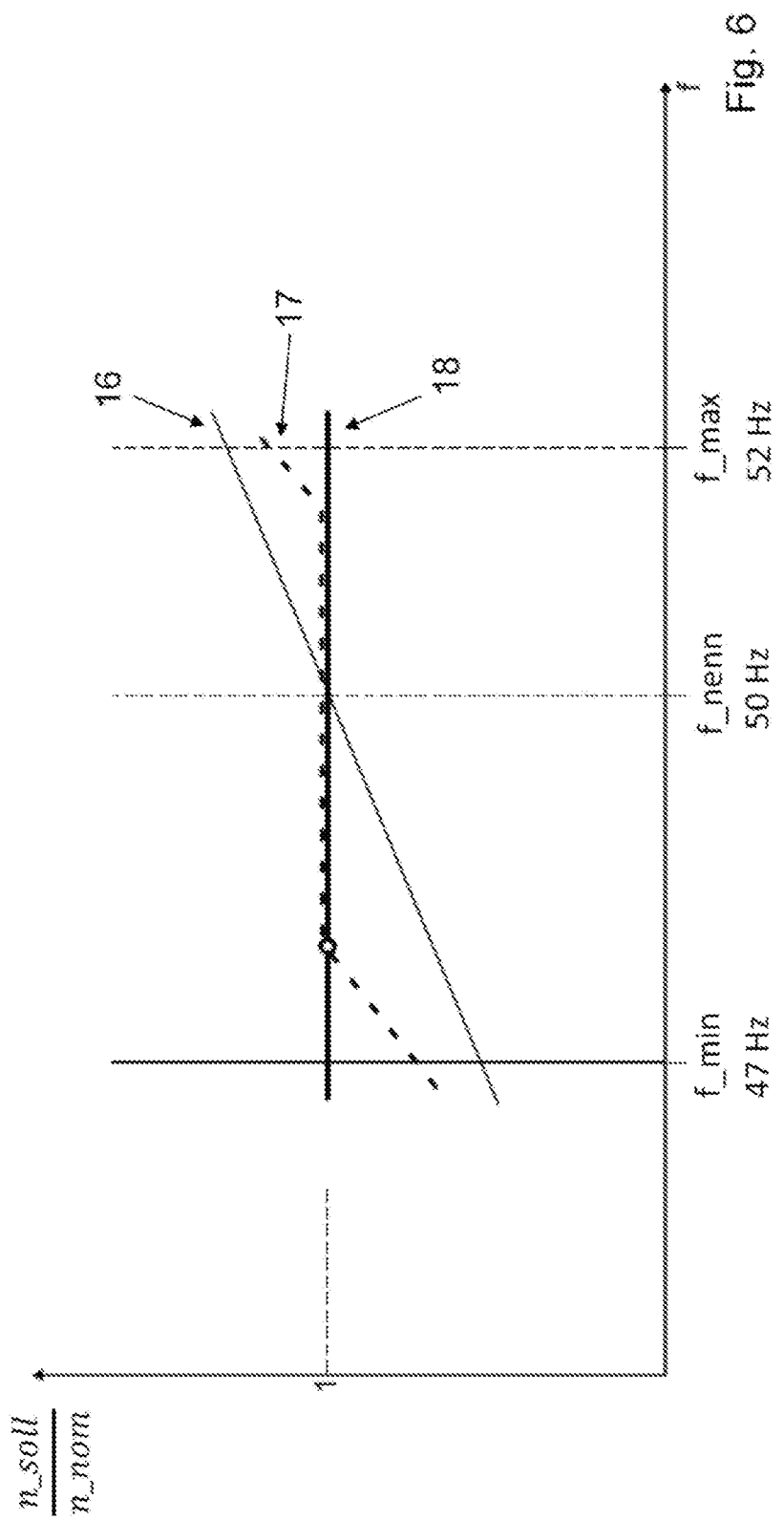

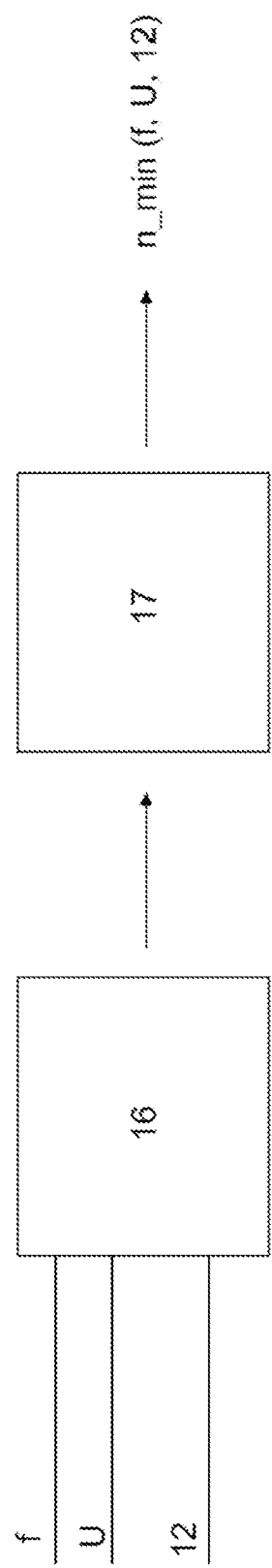

CONTROL OF A WIND TURBINE BY CHANGING ROTATION RATE PARAMETERS

CROSS REFERENCE TO RELATED APPLICATION

This application takes priority from and claims the benefit of German Patent Application 10 2018 000 157.2 filed on Jan. 11, 2018 the contents of which are herein incorporated by reference.

BACKGROUND OF THE INVENTION

Field of the Invention

The invention relates to a method for controlling a wind turbine having a wind rotor, a doubly-fed induction generator which is driven therewith and a converter, which is electrically connected to feed electrical energy into an electrical grid with at least one grid parameter, and having a controller with a memory in which rotation rate parameters are stored. The invention also relates to a wind turbine having a wind rotor, a doubly-fed induction generator which is driven therewith and a converter, which is electrically connected to feed electrical energy into an electrical grid with at least one grid parameter, and having a controller with a memory in which rotation rate parameters are stored.

Description of the Related Art

Wind turbines rely to a considerable extent on doubly-fed induction generators to generate electricity. In induction generators the stator is directly connected to the electricity grid, possibly via a transformer. In the doubly-fed induction generator (DFIG) the rotor of the generator is additionally connected to the electricity grid via a converter. The converter is also used to regulate the speed (rotation rate) of the generator. Since only about one-sixth of the power fed into the grid is fed through the rotor circuit and the converter into the grid, the converters can be designed for relatively small power levels.

A disadvantage of DFIG systems is that they react very sensitively to changes in the grid frequency. For example, the grid frequency drops if too little active power is fed into the grid, while it increases when the active power is too high. Although fluctuations in the grid parameters, in particular grid frequency fluctuations, only occur rarely in Europe, the electricity grids in other countries and on other continents do not display such grid frequency stability.

In order that the doubly-fed induction generator can cope with possible changes in the grid frequency, in particular that the converter is not destroyed by an excessive rotor voltage or rotor power, tolerances are provided in the prior art, particularly in critical areas such as the minimum rotation speed, the nominal rotation speed and the maximum rotation speed, which can have the adverse effect of reducing the power output not only at these points, but also overall.

SUMMARY OF THE INVENTION

It is also an object of the present invention to provide a method for controlling a wind turbine, which at least reduces the above-mentioned disadvantages.

The object of the present invention is to provide a wind turbine with a doubly-fed induction generator, which at least reduces the above-mentioned disadvantages.

The object is achieved with regard to its first aspect by a method referred to above having the features of claim 1.

The invention makes use of the idea of compensating for, or at least reducing the effect of grid parameter changes by means of variable, grid frequency-dependent settings of rotation speed parameters.

Rotation speed parameters here are preferably understood to mean the minimum speed, the maximum speed and the nominal speed. It is also conceivable, however, that other speeds and even more general parameters may be included.

The speed parameters of minimum speed, maximum speed and nominal speed parameters are parameters that are known to be assigned to an individual wind turbine or type of wind turbine, and once assigned, are fixed, invariant wind turbine parameters. The invention dispenses with the idea of fixed rotation speed parameters. The speed parameters are designed to be variable.

The term grid parameters here is understood in particular to refer to the mains frequency or the mains voltage.

It has been shown that grid frequency changes usually take place within a grid frequency band. The grid frequency band has a nominal grid frequency, which in Europe is 50 Hz, as well as a minimum and a maximum grid frequency. The minimum and maximum grid frequency are empirical values, within which the rarely occurring mains frequency fluctuations actually occur in practice. Usually these are between 45 Hz and 55 Hz, but grid frequency bands between 47 Hz and 52 Hz are also conceivable. All bandwidths with limits between 45 Hz and 55 Hz are also disclosed. However, grid frequency fluctuations outside these limits can also occur. Of course, corresponding values and bands also apply to grids with other nominal frequencies, such as 60 Hz.

According to the invention, at least one variable characteristic curve is determined between at least one of the rotation speed parameters and the at least one grid parameter. A characteristic curve can be determined, for example, between the minimum speed and the grid frequency, the maximum speed and the grid frequency, and the nominal speed and the grid frequency. The characteristic curve is non-trivial, according to the invention it is variable, i.e. different grid parameters are not assigned to the same speed parameters, at least not always. At least two grid parameter values are assigned different speed parameter values.

The at least one characteristic curve is determined in advance and then stored in the memory of the wind turbine. The memory, in which at least one characteristic is stored, may be the same memory in which the hitherto fixed values of the minimum speed, maximum speed and nominal speed are stored. However, it is also possible to provide a new memory. The concept of the characteristic curve is to be understood here in a general sense, and can also include functions.

According to the invention, during operation of the wind turbine the at least one grid parameter is measured, preferably being continuously measured; it is also conceivable, however, that the grid parameter is measured at regular or different intervals. The determined values of the grid parameters are used as grid parameter values of the control system, and the control system determines on the basis of the stored associated characteristic between the grid parameter value and the speed parameter value, and these values of the at least one speed parameter are assigned to the measured values of the grid parameter using the at least one characteristic curve. These new and modified speed parameter values are then preferably activated by the wind turbine control system and used as a basis of the wind turbine control system.

Particularly preferably, the at least one characteristic curve provides a relationship between the grid frequency and the minimum speed or the maximum speed or the nominal speed.

The memory preferably contains a plurality of different stored characteristic curves between grid parameters and speed parameters. By all means, a plurality of different characteristics between the same grid parameters and speed parameters can also be stored. The selection of the characteristic curve can be either automatically controlled or made by manual input.

Preferably, the minimum speed and/or the maximum speed and/or the nominal speed in the at least one characteristic curve are increased with increasing grid frequency.

In the area of minimum speed, i.e. the rotation speed of the rotor at which the wind turbine supplies the grid, i.e. outputs power thereto, the problem arises that at higher grid frequencies than the nominal grid frequency, a higher voltage is induced on the rotor than at the nominal grid frequency, which is then applied to the converter in the rotor circuit and can damage it if the maximum converter voltage is exceeded. At a constant minimum rotation speed, which extends over all grid frequencies, the minimum speed of the nominal grid frequency has already been set so high that a sufficient tolerance exists on the maximum converter voltage, which handles possible fluctuations in the nominal grid frequency. However, as a result, the power output of the wind turbine is reduced.

The invention makes use of the idea, among others, of making the minimum speed dependent on the grid frequency. The minimum speed is variable or changeable, and so it is a function of the grid frequency actually applied to the generator.

Preferably, the characteristic curve is defined such that the minimum rotation speed is increased with increasing grid frequency. Particularly preferably, the relationship is chosen in such a way that the minimum speed is set higher, the higher the grid frequency. Specifically, the maximum grid frequency of the grid frequency band is assigned a minimum speed in such a way that the generated rotor voltage always remains below the permissible converter voltage.

At the other end of the rotation speed spectrum, a characteristic curve is defined such that the maximum speed is preferably also increased with increasing frequency. Here also, the characteristic curve can be determined in such a way that the higher the grid frequency becomes, the higher the maximum rotation speed is chosen. Other relationships are also possible, however. In particular, the relationships can be chosen in such a way that a grid frequency dependency only comes into play when the grid frequency is very close, i.e. within +/–0.5 Hz of the minimum or maximum frequency.

Particularly preferably, the nominal rotation speed is increased at a grid frequency above the nominal grid frequency.

If the grid frequency decreases as a result of the modification, this causes in effective power distribution between the rotor and the stator of the generator, this leads to an increase in the power at the rotor and thus at the converter, which can cause damage to the converter. Therefore, it is provided according to the invention to lower the nominal speed in the electrical grid in the under frequency case, and preferably to lower it by a greater amount the lower the grid frequency becomes. Conversely, an increase in the grid frequency above the nominal grid frequency leads to an increase in the power in the stator and thus also to increased currents in the stator, rotor and converter at the generator. To this end, according to the invention a characteristic curve is implemented which increases the nominal speed in the electrical grid in the over frequency case, preferably by a greater amount the higher the grid frequency becomes.

In order to avoid continuously activating new speed parameters, even for minimal changes in the grid parameters, the control system is preferably provided with a certain inertia, so that the change in the speed parameter preferably takes place only after a time delay, within which the modified grid parameter must also be stable, at least within tolerances. Preferably, the modified speed parameter assigned to a modified grid parameter value is therefore activated only after a time delay, within which a modified grid parameter value is confirmed. This is particularly the case when a slow heating of components occurs due to the change in the grid frequency.

Preferably, it can be stipulated that a change in the grid parameters results in an immediate change of certain speed parameters. For example, if the change in the grid parameters induces a rotor voltage which is too large, which would also damage the converter in a short period of time.

Preferably, the control system is equipped with a protective device which shuts down the entire wind turbine when specified speed values are exceeded. Advantageously, shut-off values of a protective device are varied in accordance with the speed parameter values.

The invention is also realized by a wind turbine of the type described above having the features of claim 13.

The wind turbine is particularly suitable for implementing one of the above-mentioned methods, and conversely, the above methods are also suitable for implementation on one of the wind turbines described below.

The wind turbine according to the invention has, in the standard manner, a control system with a memory, in which values for rotation speed parameters are stored, such as minimum speed, maximum speed and nominal speed. These parameters may quite possibly also be different, as stated above.

With regard to the device in accordance with the invention also, it is crucial that variable characteristic curves relating to at least one of the speed parameters and the at least one grid parameter are stored in the memory. The at least one characteristic curve is ideally determined and stored in the memory of the controller before the initial installation of the wind turbine.

According to the invention a grid parameter measuring device is provided, which is preferably electrically conductively connected to the controller and which feeds its measurements to the controller, and the controller activates the speed parameter values assigned to the grid parameter measurements.

Preferably, in the at least one characteristic curve, the minimum speed increases with increasing grid frequency, or else it decreases with decreasing frequency. Ideally, the maximum speed increases with increasing grid frequency, or it decreases with decreasing grid frequency. Finally, the nominal speed preferably increases with increasing grid frequency, or it decreases with decreasing grid frequency.

With varying grid frequency, the synchronous speed changes accordingly. Due to the change in the synchronous speed, the slip of the asynchronous generator also changes. Since the rotor voltage varies substantially in proportion to the slip, too high a rotor voltage at the minimum and maximum speed and a power displacement at the nominal speed are counteracted by the fact that the speed parameters change in the same direction as the grid frequency, in order to change the slip as little as possible.

The grid parameter measuring device is in particular a grid frequency measuring device.

The grid frequency can be determined in the conventional way. The possible relationships between the wind turbine parameters and the grid frequency have already been described with regard to the method and also apply to the wind turbine.

BRIEF DESCRIPTION OF THE DRAWINGS

The invention will now be described in further detail based on an exemplary embodiment in seven figures. These show.

DETAILED DESCRIPTION OF THE SEVERAL EMBODIMENTS

Figure 1:
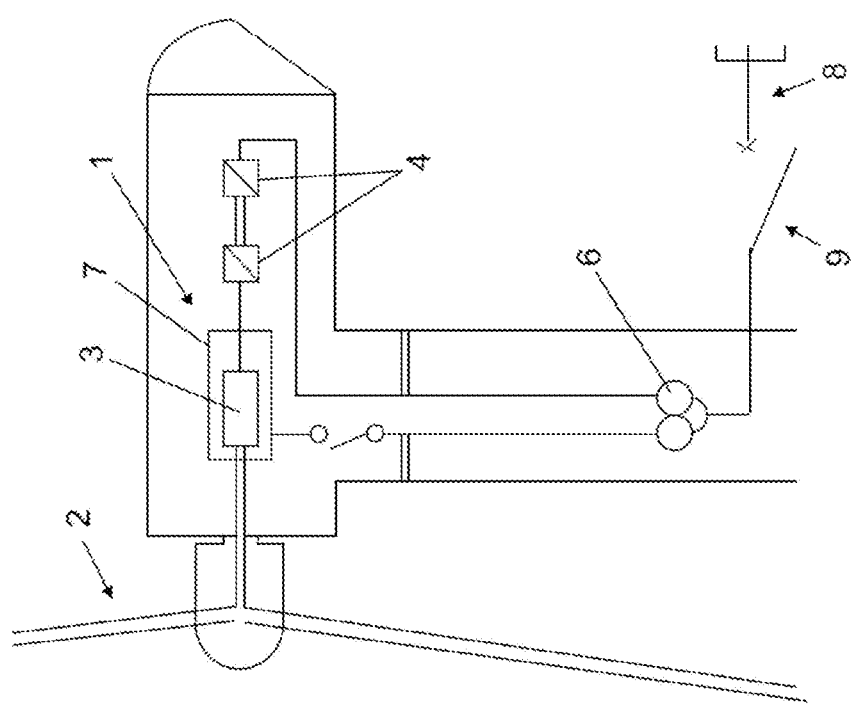
FIG. 1 a schematic view of a wind turbine according to the invention with doubly-fed asynchronous generator, FIG. 2 a typical torque-speed characteristic curve, FIG. 3 a rotor voltage as a function of the rotation speed at different grid frequencies of a grid frequency band, FIG. 4 an effective power distribution between the stator and rotor of the doubly-fed induction generator, FIG. 5 an illustration of the control principle according to the invention, FIG. 6 a schematic illustration of grid frequency-dependent rotation speed changes, FIG. 7 a schematic illustration of the rotation speed change in a multi-dimensional characteristic map.

The general structure of a wind turbine with a doubly-fed induction generator 1 is shown in FIG. 1. A wind rotor 2 is set into rotational motion by wind. The wind rotor 2 is connected via a drive train to a transmission, not shown, to a rotor 3 of the doubly-fed induction generator 1. The doubly-fed induction generator 1 is electrically conductively connected to a converter 4 on the grid side. The converter 4 is in turn connected to the electricity grid via a transformer 6. On the other side, a stator 7 of the doubly-fed induction generator 1 is also connected to the transformer 6 via an electrically conductive connection. The transformer 6 is connected to the electrical grid 8 via a power switch 9.

The transformer 6 is designed with three windings. There are separate windings for the power circuit of the stator 7 and the converter 4. However, transformer designs with two or even a higher number of windings are also conceivable.

Figure 2:
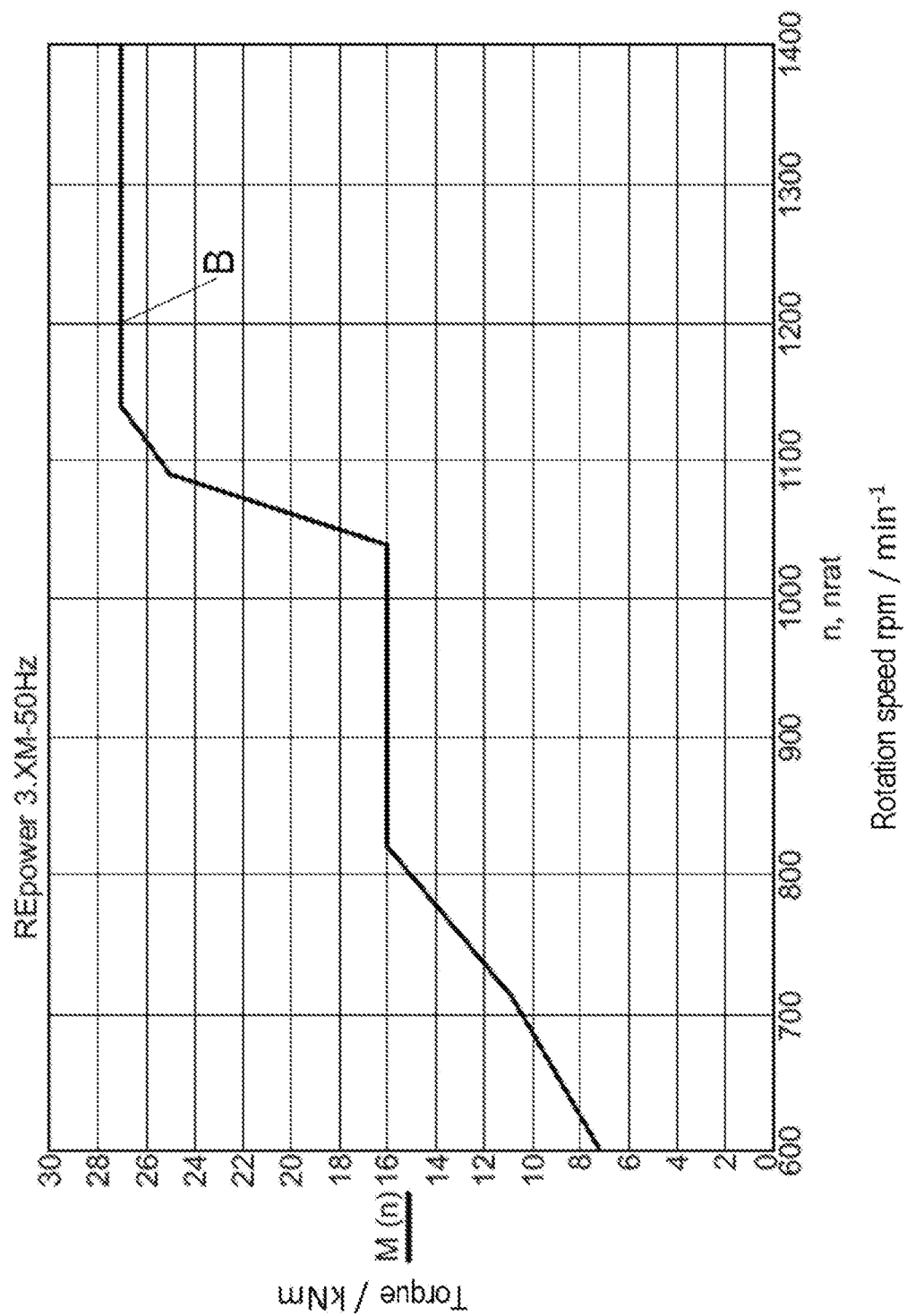

FIG. 2 shows a conventional torque-speed characteristic for a REpower (Senvion) system 3.XM for a grid frequency f of 50 Hz. More precisely, this is a limiting characteristic curve, the values of which must not be exceeded. A typical real characteristic curve would lie below the limiting characteristic curve. The torque and speed are determined on a rotor shaft of the rotor 3. A minimum speed of 600 revolutions per minute and a maximum speed of 1,400 revolutions per minute are shown. They correspond by chance to the right and left ends of the graph. At lower or higher speeds the wind turbine is not in operation, i.e. the rotor blades are positioned in such a way that no wind impinges on them and the wind rotor 2 does not rotate. In this example the nominal speed is 1,200 revolutions per minute. The nominal torque is approximately 27 kNm.

In the partial load range at lower speeds than the nominal speed, the rotor blades are usually positioned in such a way that they harvest the full energy of the wind. In the partial load range up to and including the operating point B, the wind turbine can generate power for an unlimited period of time. In the full load range above the nominal speed this is only possible to a limited extent, to prevent overload.

If the turbine has reached its nominal speed, the torque reaches its highest value and should not be exceeded, in order not to damage the wind turbine. When the wind blows strongly, the pitch angle is further increased. On reaching the maximum speed, further increasing the pitch angle may cause a stall to occur, and the wind turbine no longer supplies power.

Initial remarks are given on the following figures. In the doubly-fed induction generator 1 a slip s is a critical electrical parameter. The characteristic properties of the doubly-fed induction generator 1 include the fact that a grid frequency f applied to the stator 7 induces a rotating field between the stator 7 and the rotor 3, which has a synchronous rotation speed, wherein the following equation applies for the synchronous speed $$n\_syn = \frac{f}{ppz}$$

where f is the grid frequency and ppz is the pole pair number of the stator 7.

For a nominal grid frequency f_nenn=50 Hz, for a two-pole generator a synchronous speed of 3,000 rpm is obtained and for a six-pole generator, a synchronous speed of n_sync=1,000 rpm. The rotor 3, which is connected via the mechanical drive train to the wind rotor 2, rotates with another speed n, which is usually different from the synchronous speed. The resulting slip s is a measure of the deviation of the actual speed n of the rotor 3 from the synchronous speed n_sync according to:

$$s = \frac{n\_sync - n}{n\_sync}.$$

The slip s is therefore dependent in particular on the grid frequency f. Specifically the slip s=0 when the rotor 3 rotates with the synchronous speed n_sync, and s=1 when the rotor 3 is stationary.

For the analysis according to the invention, it is important that the effective power distribution between the stator 7 and the rotor 3 of the generator, as well as a rotor voltage UR, changes with the synchronous speed n_sync or the slip s. The following applies for the active powers:

$$P\_stator = P\_total * n\_sync/n = P\_total * (1/(1-s))$$

and $$P\_rotor = P\_total * (1 - n\_sync/n) = P\_total * (-s/(1-s))$$

with P_total=P_rotor+P_stator.

For the rotor voltage UR the following applies:

$$UR = UR0 * s$$

Here UR0 is the so-called rotor standstill voltage, i.e. the voltage that is obtained when the rotor is stationary.

Figure 3:
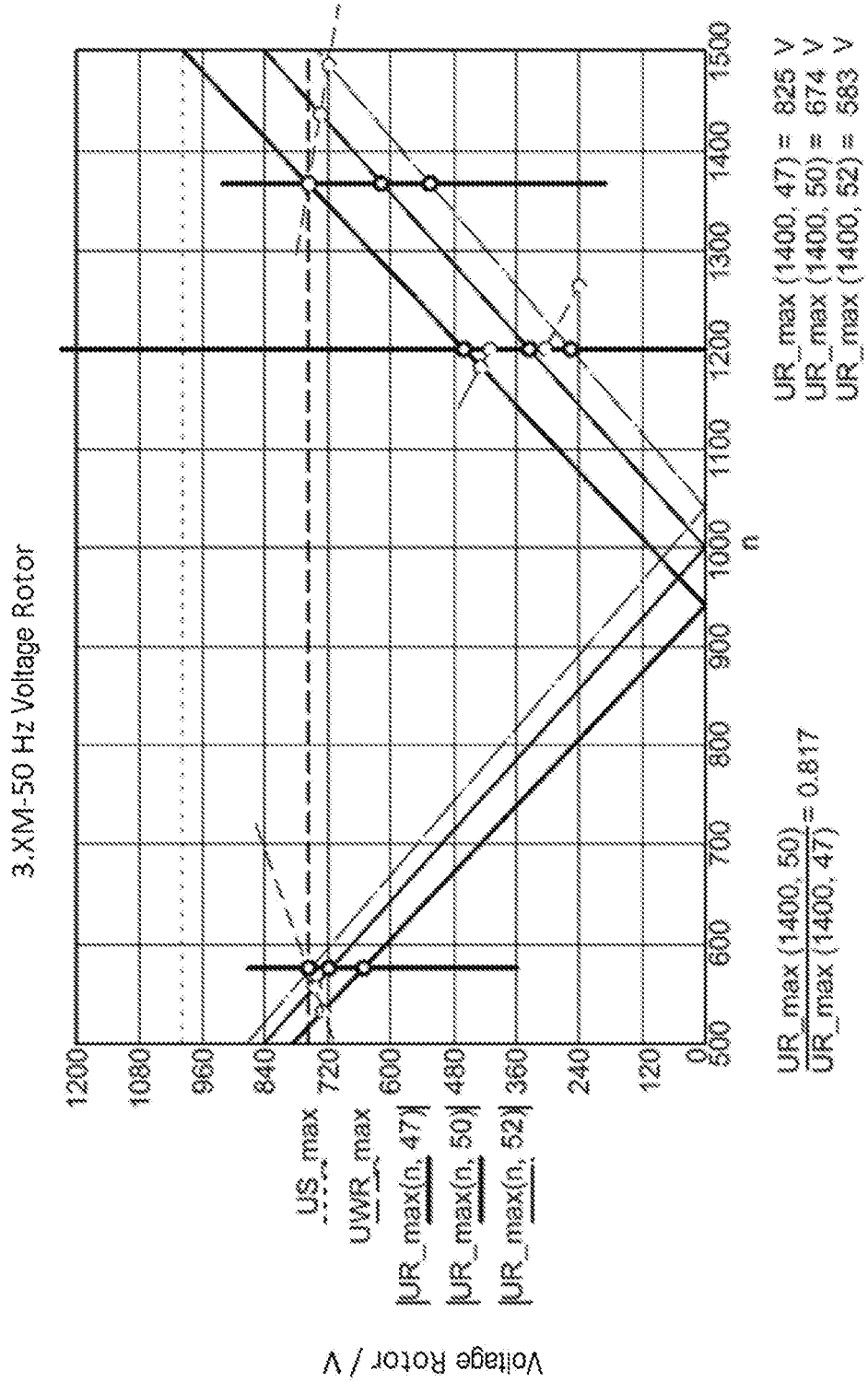
Figure 4:
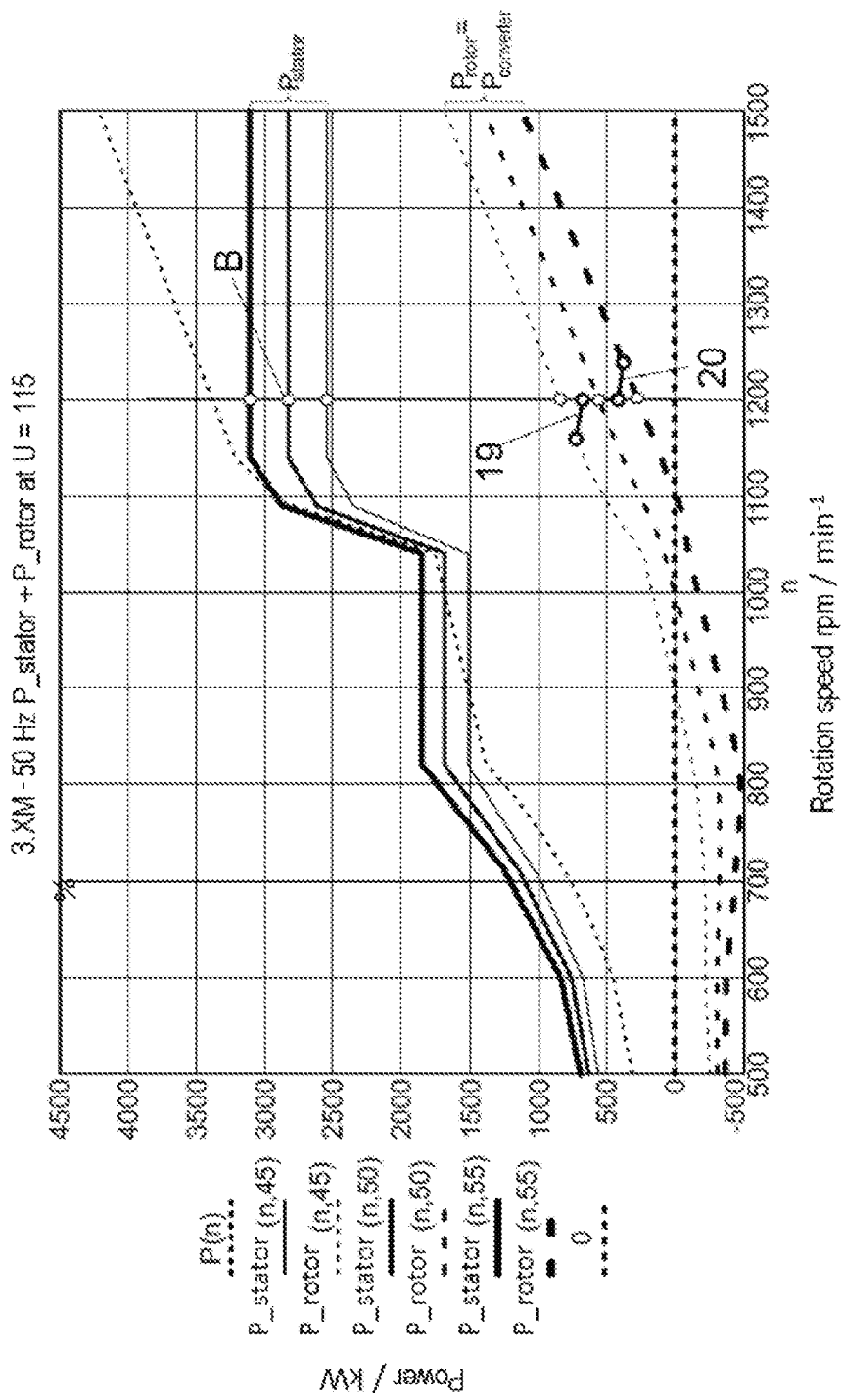

In FIG. 3 a family of parameters of maximum rotor voltages UR_max is parameterized for different values of the grid frequency f. Since the voltage is applied to the rotor 3 as an alternating voltage, the amplitudes here of the alternating voltage are plotted as U_max. In FIG. 4 the parameter family of rotor and stator powers P_rotor, P_Stator is also parameterized for different grid frequencies f. The term power here means the active power.

Both parameter families are plotted against the speed n.

FIG. 3 shows the dependence of the rotor voltage UR on the speed n at the grid frequencies f=47 Hz, f=50 Hz, and f=52 Hz. In addition, the maximum permissible converter voltage US max of approximately 760 V is indicated. The rotor voltage UR is applied across the converter 4 as shown in FIG. 1.

FIG. 3 shows the parameter family of a Senvion 3.XM wind turbine for a nominal grid frequency f_nenn of f=50 Hz. The 3.XM has a six-pole generator, so that its synchronous speed is n_sync=1,000 revolutions per minute.

The middle solid line shows the voltage characteristic for a nominal grid frequency f_nenn of 50 Hz over the speed range. In the case of deviations of the grid frequency f which persist over a longer period of time, different stationary conditions are obtained, which are shown by the thick black line for a grid frequency f of 47 Hz and by a thin black broken line for a grid frequency f of 52 Hz. The broken line represents the voltage characteristic UR_max (n, 52) at a grid frequency f of f=52 Hz and the thick line represents the voltage characteristic UR_max (n, 47) at a grid frequency f of f=47 Hz. Three vertical lines are drawn for the fixed minimum speed n_min, the nominal speed n_nenn and the maximum speed n_max according to the prior art. The minimum speed n_min of the wind turbine is approximately 570 rpm, the nominal speed n_nenn is 1,200 rpm and the maximum speed n_max is approximately 1,370 rpm.

At a fixed minimum speed n_min and a fixed maximum speed n_max, the minimum speed n_min and the maximum speed n_max must be selected such that a voltage tolerance range UWR_max is applied to the maximum permissible converter voltage, which takes account of the possible frequency fluctuations. The calculation is based on a grid frequency band between a minimum grid frequency f_min and a maximum grid frequency f_max, which here have the values f_min=47 Hz and f_max=52 Hz. Other grid frequency bandwidths are quite possible. The grid frequency bandwidths also depend on the regional or national conditions, i.e. the extent to which grid standards are actually observed.

At grid frequencies f above the nominal grid frequency f_nenn of 50 Hz, at low rotation speeds n, particularly in the region of the minimum speed n_min, a higher rotor voltage UR_max is induced, which loads the converter 4. In the region of the maximum speed n_max, on the other hand, the situation is reversed, specifically the maximum rotor voltage UR_max is greater when the mains frequency f is below the nominal grid frequency f_nenn. The invention here makes use of the idea of designing the minimum speed n_min and the maximum speed n_max to be variable, i.e. the minimum speed n_min(f) and the maximum speed n_max(f) are each to be implemented as a function of the actually occurring grid frequency f. One dependency alongside many other possible variable dependencies is represented by the inclined straight lines in FIG. 3.

The variable dependency of the activation and shut-off values of the speed n gives rise to the possibility of extending the available speed range in both directions even at the nominal grid frequency f_nenn, and reducing the maximum speed n_max at lower grid frequencies f and enlarging the minimum speed n_min at higher grid frequencies f.

Due to the characteristics of the doubly-fed induction generator 1, the ratio of stator and rotor active power P_stator, P_rotor shifts in accordance with FIG. 4. The rotor active power P_rotor increases with increasing speed n for all grid frequencies f of the grid frequency band.

The three solid lines relate to the stator power P_stator at different grid frequencies f=45 Hz, f_nenn=50 Hz and f=55 Hz. The dashed lines designate the rotor power P_rotor at the same grid frequencies f=45 Hz, f_nenn=50 Hz and f=55 Hz. For speeds n greater than the nominal speed n_nenn the stator powers P_stator each remain initially constant, while for speeds n greater than the nominal speed n_nenn the rotor powers P_rotor steadily increase approximately linearly.

Changes in the grid frequency f lead to changes in the distribution of power between the rotor 3 and stator 7 in accordance with FIG. 4. In the case of underfrequency, i.e. at grid frequencies f below the nominal grid frequency f_nenn, a greater proportion of active power P_rotor (n, 45) is obtained on the rotor 3, so that the converter 4 and the winding of the transformer 6 connected to the converter 4 are more heavily loaded. In the case of overfrequency, i.e. at grid frequencies f above the nominal grid frequency f_nenn, a greater proportion of active power P_stator (n, 55) is obtained on the stator 7 and the winding of the transformer 6 connected to the stator 7. Hence, particularly in the case of underfrequency, a higher load is obtained on the converter 4 and the associated winding of the transformer 6.

In particular, a consequence of the reduction of the mains frequency f for a constant speed n is that, in accordance with FIG. 4, a significantly higher power acts on the converter 4. This also applies to the nominal speed n_nenn at the operating point B. Operating points B with high power are therefore underfrequency-critical.

According to the invention, the nominal speed n_nenn is reduced at lower grid frequencies f, and it can be increased at higher grid frequencies f. These two shifts are indicated in FIG. 4 by two lines 19, 20. The line 19 represents a shift of the nominal speed n_nenn from a nominal speed n_nenn=1200 at a grid frequency of f=50 Hz to a nominal speed n_nenn=1160 at a grid frequency of f=45 Hz. The numbers chosen are only examples.

The line 20 represents a shift of the nominal speed n_nenn from a nominal speed n_nenn=1200 at a grid frequency of f=50 Hz to a nominal speed n_nenn=1240 at a grid frequency of f=55 Hz. The figures chosen are again only examples. The essential connection is clear, however, of choosing lower nominal speeds at lower grid frequency and higher nominal speeds at higher frequency, in order to reduce the power shift between the stator on one side and the rotor or converter on the other side.

The corresponding changes in the converter voltage UWR or rotor voltage UR are also plotted in FIG. 3.

According to the invention, the nominal speed n_nenn is regulated downwards in the case of underfrequency. In the case of overfrequency it can be regulated upwards to achieve a higher power output at the rotor 3.

FIG. 5 shows an extension of the described invention. According to the invention, the measured mains frequency f has a variable effect on the minimum speed n_min, and the nominal speed n_nenn and the maximum speed n_max; other wind turbine parameters 11 may also be affected. In addition, it would be conceivable for the minimum speed n_min, nominal speed n_nenn and maximum speed n_max to also be influenced by a varying grid voltage U or by other parameters 12 of the electricity grid. Downstream of the control device 13 of the wind turbine is a protective device 14, which shuts down the wind turbine when shut-off values are exceeded, the sizes of which are related to the minimum speed n_min, nominal speed n_nenn and maximum speed n_max. According to the invention the shut-off values of the protective device 14 are also increased or decreased in accordance with the values of the minimum speed n_min, nominal speed n_nenn, maximum speed n_max.

FIG. 6 shows two possible relationships between the speed n and the grid frequency f. n_nom here also collectively denotes the constant maximum speed n_max, minimum speed n_min, or nominal speed n_nenn. The parameters according to the invention of maximum speed n_max, minimum speed n_min or nominal speed n_nenn that depend on the mains frequency f and are here collectively designated as n_soll, can have very different dependencies. In principle, it is conceivable that the maximum speed n_max, minimum speed n_min or nominal speed n_nenn varies linearly with the grid frequency f according to the characteristic curve 16, both in the positive and negative directions, or that the grid frequency influence is only apparent at the edges of the grid frequency band in accordance with characteristic 17 shown in FIG. 6. The horizontal characteristic curve 18 illustrates no frequency influence on the speed parameters.

FIG. 7 shows a generalized flow diagram for controlling the speed parameters n_min, n_max, n_nenn as a function of various grid parameters. In FIG. 7 only the minimum speed n_min is shown, as an example. On the one hand, the grid parameters of grid frequency f, grid voltage U and other parameters 12 are shown as possible grid parameters affecting the speed parameters n_min, n_max and n_nenn. The relationship between the influence of the speed parameters n_min, n_max and n_nenn, however, unlike those shown in FIG. 3 and FIG. 4, can not only be a one-dimensional characteristic curve, i.e. a function of the grid frequency f, but instead the speed parameters can be represented as a multi-dimensional function, i.e. multi-dimensional characteristic map 16 of the various grid parameters.

In addition, the control unit can be followed by a downstream inertia or delay unit 17. In the case of certain grid parameter changes, it may make sense if changes in the speed parameters n_min, n_max, n_nenn of the wind turbine are only carried out after a delay, thus when a specific change in grid frequency f has occurred. This is particularly the case when the change in the grid frequency f in certain speed ranges only causes a slow heating of components. On the other hand, it may be possible that the change in the grid frequency f makes an immediate response necessary, and the speed parameters n_min, n_max, n_nenn of the wind turbine must be changed immediately. This is particularly the case should the converter voltage U converter increase abruptly. A delay or an immediate change in the speed parameters n_min, n_max, n_nenn may therefore depend on which grid parameters change and on the speed range in which the turbine is currently operating.

LIST OF REFERENCE NUMERALS

1 induction generator
2 wind rotor
3 generator rotor
4 converter
6 transformer
7 generator stator
8 electricity grid
9 power switch
11 wind turbine parameters
12 miscellaneous parameters
13 control unit
14 protective device
16 characteristic
17 characteristic
18 characteristic
19 line
20 line
f grid frequency
n rotation rate
U grid voltage

What is claimed is:

1. A method for controlling a wind turbine having a wind rotor (2), a doubly-fed induction generator (1) driven thereby, and a converter (4),
    which is electrically connected to feed electrical energy into an electrical grid (8) with at least one grid parameter; and
    having a controller with a memory, in which rotation rate parameters are stored;
    characterized in that
    at least one variable characteristic curve is generated between at least one of the rotation rate parameters and the at least one grid parameter;
    by the at least one grid parameter is selected as a grid frequency (f) and the at least one rotation rate parameter is selected as a minimum rotation speed n min and a maximum rotation speed n max and the minimum rotation speed n min and a maximum rotation speed n max change in the same direction as the grid frequency (f);
    the at least one variable characteristic curve that is generated is stored in the memory of the controller;
    the at least one grid parameter is measured, the grid parameters measurements are fed to the controller; and the values of the at least one rotation rate parameter that are associated with the grid parameter measurements via the at least one characteristic curve are activated by the controller to control the wind turbine.

2. The method according to claim 1, characterized in that a rotation rate parameter is selected from a group of minimum rotation speed n_min, maximum rotation speed n_max, nominal rotation speed n_nenn.

3. The method according to claim 1, characterized in that the grid parameters are selected from a group of grid frequency (f), grid voltage (U).

4. The method according to claim 1, characterized in that a grid frequency band with a minimum grid frequency f_min and a maximum grid frequency f_max is defined about a nominal grid frequency f_nenn and a grid frequency (f) is measured in the grid frequency band.

5. The method according to claim 1, characterized in that at least one of the minimum rotation speed n_min, the maximum rotation speed n_max, and the nominal rotation speed n_nenn in the at least one variable characteristic curve is increased with increasing grid frequency (f).

6. The method according to claim 1, characterized in that the minimum rotation speed n_min of the nominal grid frequency f_nenn is selected to be lower than the minimum rotation speed n_min of the maximum grid frequency f_max in the at least one characteristic curve.

7. The method according to claim 1, characterized in that the maximum rotation speed n_max of the nominal grid frequency f_nenn is selected to be greater than the maximum rotation speed n_max of the minimum grid frequency f_min in the at least one characteristic curve.

8. The method according to claim 1, characterized in that a nominal rotation speed n_nenn at a minimum grid frequency f_min is selected to be lower than the nominal grid frequency f_nenn in the at least one characteristic curve.

9. The method according to claim 1, characterized in that a nominal rotation speed n_nenn at a maximum grid frequency f_max is selected to be greater than the nominal grid frequency f_nenn in the at least one characteristic curve.

10. The method according to claim 1, characterized in that a modified rotation speed parameter assigned to a modified grid parameter value is activated only after a delay.

11. The method according to claim 1, characterized in that cut-off values of a protective device (14) are changed according to the rotation speed parameter values.

12. A wind turbine having a wind rotor (2), a doubly-fed induction generator (1) driven thereby, and a converter (4), which is electrically connected to feed electrical energy into an electrical grid (8) with at least one grid parameter, and having a controller with a memory, in which a rotation rate parameters are stored, comprising:
at least one variable characteristic curve relating to at least one of the rotation speed parameters and the at least one grid parameter is stored in the memory;
at least one grid parameter is selected as a grid frequency (f) and the at least one rotation rate parameter is selected as a minimum rotation speed n min and a maximum rotation speed n max and the minimum rotation speed n min and a maximum rotation speed n max change in the same direction as the grid frequency (f);
a grid parameter measuring device is electrically conductively connected to the controller and feeds measurements from the grid parameter measuring device to the controller; and
the controller activates the rotation speed parameters that are associated with the grid parameter measurements via the at least one variable characteristic curve.

13. The wind turbine according to claim 12 characterized in that the rotation speed parameter originates from a group of minimum rotation speed n_min, maximum rotation speed n_max, nominal rotation speed n_nenn.

14. Wind turbine according to claim 12, characterized in that the grid parameter measuring device comprises a grid frequency measuring device.

15. Wind turbine according to claim 12, characterized in that in at least one of the parameters selected from the minimum rotation speed n_min and/or the maximum speed n_max and/or the nominal speed n_nenn increases with increasing grid frequency (f).

* * * * *